Patented Aug. 13, 1929.

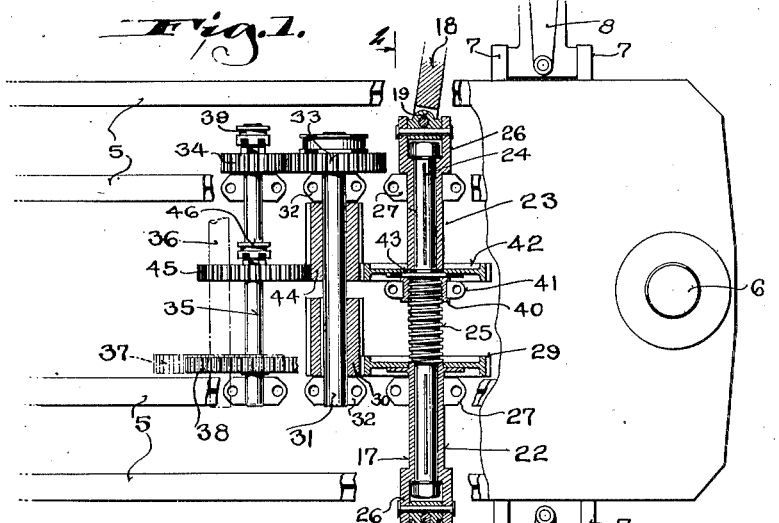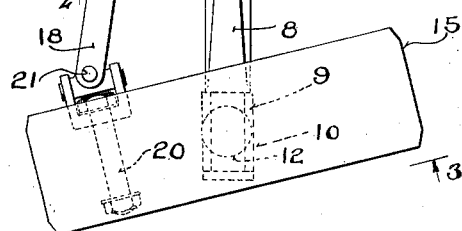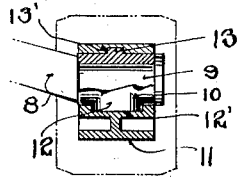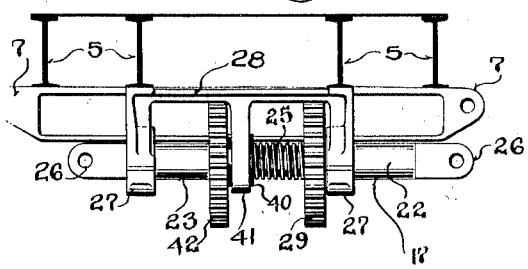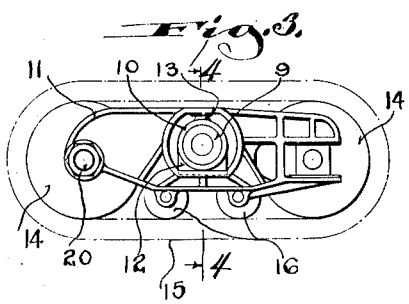

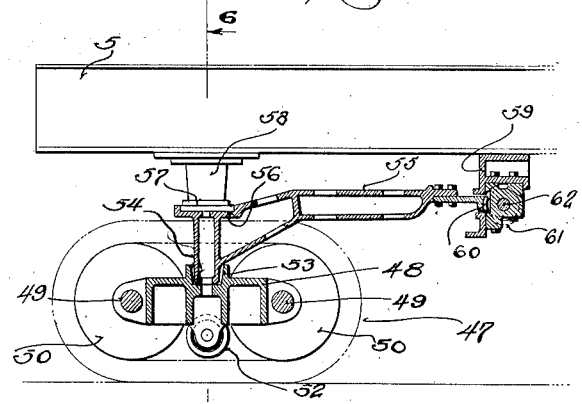
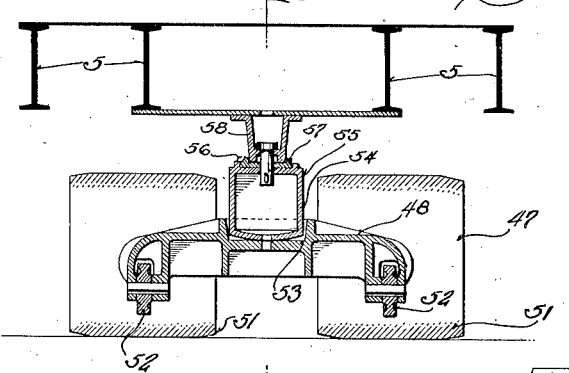
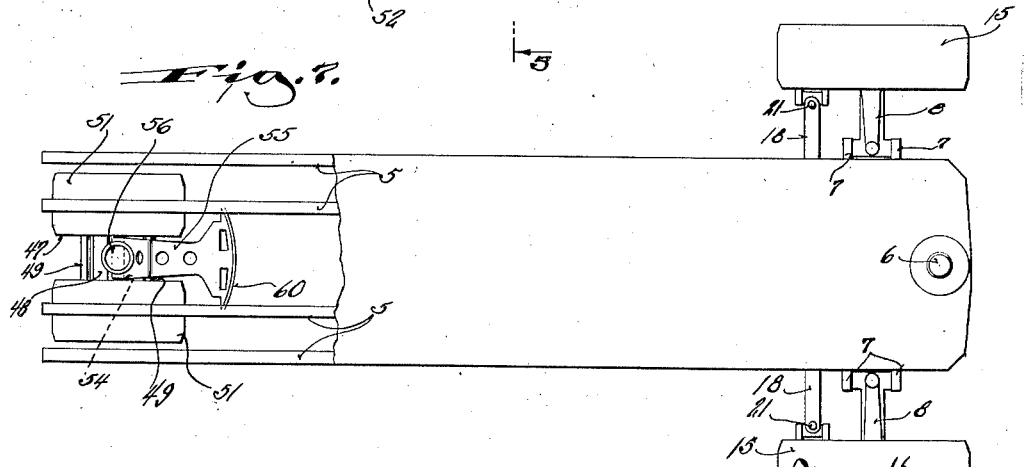

1,724,166

UNITED STATES PATENT OFFICE.

SVANTE R. W. M. BAGER, OF SOUTH MILWAUKEE, WISCONSIN, ASSIGNOR, BY MESNE ASSIGNMENTS, TO BUCYRUS-ERIE COMPANY, OF SOUTH MILWAUKEE, WISCONSIN, A CORPORATION OF DELAWARE.

EXCAVATOR OR THE LIKE.

Application filed February 26, 1923. Serial No. 621,305.

This invention relates to certain new and useful improvements in excavators or the like and refers more particularly to excavators of that type described in the co-pending application, filed August 31, 1921, Serial No. 497,200.

In that type of excavator illustrated in the co-pending application above referred to, the creeping traction members supported from the forward jack-arms are held against movement on a vertical axis and the steering of the excavator accomplished by the rear traction member or members. With such a construction it has been found difficult to make a sharp turn and it is, therefore, one of the objects of this invention to provide means for steering the traction members supported from the jack-arms.

It is another object of this invention to provide improved means for mounting the creeping traction members on the outer ends of the jack-arms whereby the same are free to move on a horizontal axis to accommodate any unevenness in the surface over which the excavator is propelled and, at the same time, movement on a vertical axis is unrestricted for the purpose of steering.

This invention has for a further object to provide a combined drive and steering shaft for the forward creeping traction members to thus effect simplicity and economy in construction.

A further object of my invention is to provide an improved mounting for the rear creeping traction unit which permits the unit to freely adjust itself to any unevenness in the surface over which it passes without interfering with the steering thereof.

And a still further object of this invention resides in the provision of an excavator or the like having front and rear creeping traction units capable of either joint or independent steering action.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a view, partly in top plan and partly in section, illustrating the forward end of an excavator embodying this invention;

Figure 2 is a view taken through the excavator frame on the plane of the line 2—2 of Figure 1 and illustrating the manner of mounting the combination drive and steering shaft;

Figure 3 is a side view of one of the creeping traction members, said view being taken on the plane of the line 3—3 of Figure 1;

Figure 4 is a fragmentary detail view, partly in section and partly in elevation, taken through Figure 3 on the plane of the line 4—4;

Figure 5 is a longitudinal sectional view taken through the rear creeping traction unit on the plane of the line 5—5 of Figure 6;

Figure 6 is a transverse sectional view taken through Figure 5 on the plane of line 6—6, and Figure 7 is a top plan view, in conventional lines, illustrating the general disposition of the creeping traction units.

Referring now more particularly to the accompanying drawing, in which like numerals designate like parts throughout the several views, the numeral 5 designates the I-beams or sills forming the frame work of the excavator frame mounting the usual swivel support 6 for the boom, not shown, and pairs of spaced lugs or brackets 7 between which laterally projected jack-arms 8 are secured.

The outer end of each jack-arm 8 terminates in a journal 9 which is journaled in a bearing 10 to which is secured the frame 11 of a creeping traction mounting. Each bearing 10 has a depending circular boss 12 journaled in a cup or recess 12′ in frame 11 and an upwardly projecting lug or boss 13 journaled in a recess 13′ in axial alinement with recess 12′. In this manner the creeping traction mountings are permitted steering movement on a vertical axis intersecting the axis of journal 9, and movement on the horizontal axis of the journal 9 to accommodate any unevenness in the surface over which the excavator may be propelled.

Journaled in the ends of each frame 11 are wheels 14 about which is trained a creeping traction member or endless tread member 15 having its lowermost tread medially braced by idle wheels 16. The traction members 15 are driven from a combined drive and steering shaft 17 by means of coupling drive pins 18 having their inner ends connected the adjacent ends of shaft 17 by universal joints 19 and their outer ends connected with the shaft 20 of one wheel 14 of each traction member by universal joints 21.

The combination drive and steering shaft 17 comprises two end sleeve members 22 and 23 splined to a shaft 24 with their inner ends in spaced relation to confine a screw or worm 25, freely journaled on the intermediate portion of shaft 24, against longitudinal movement. The universal joints 19 connecting the coupling drive pins 18 with the combined drive and steering shaft are connected with said shaft between spaced lugs or ears 26 formed in the outer ends of the sleeves 22 and 23.

The combined drive and steering shaft is journaled for limited longitudinal sliding movement in bearings 27 carried by a casting or bracket frame 28 secured to the under surface of the inner-most sills 5, and receives its drive through a gear wheel 29 made fast to the inner end of sleeve 22 and meshed with a gear 30 splined to a driven shaft 31. Shaft 31 is journaled in bearings 32 secured to the under surface of the innermost sills 5 and has a gear 33 fixed to one end thereof and meshed with a drive pinion 34 freely rotatably mounted on a countershaft 35 which is driven by a drive shaft 36 through the medium of gears 37 and 38. The drive pinion 34 is provided with a clutch 39 whereby shaft 17 is connected with its source of power to drive the traction members.

A suitable drive engine, not shown, is connected with shaft 36 to rotate the same in either direction, and when the excavator is advanced, shaft 36 is rotated in the proper direction and clutch 39 thrown into operative position. The excavator is reversed by changing the direction of rotation of shaft 36, as will be obvious.

The steering of the traction members supported from the jack-arms 8 is effected by longitudinally shifting the combined drive and steering shaft 17 and in the drawings they are illustrated in a position steering the excavator to the left. The screw or worm 25 is threaded in a nut 40 which is rigidly secured against longitudinal and rotary movement in a bracket arm 41 carried by the casting 28, whereby rotation of worm 25 in one direction will effect a shifting of the shaft in one direction and rotation of the worm in a reverse direction will cause a shifting of the shaft in the opposite direction.

Worm 25 is rotated by a gear 42 made fast thereto, as at 43, intermediate nut 40 and the inner end of sleeve 23, said gear being meshed with a drive pinion 44 freely journaled on shaft 31 and meshed with a gear 45 adapted to be drivingly connected with drive shaft 35 through a clutch mechanism 46. When it is desired to steer the excavator, drive shaft 36 is rotated in the desired direction and clutch 46 engaged, as a result of which sleeve 25 is rotated through the train of gears represented by gears 42, 44 and 45 causing the worm 25 to move through the nut and shift the combined drive and steering shaft, moving the traction members on their pivots 12 and 13. In order to accommodate the longitudinal shifting of shaft 17, the gears 30 and 44 are of a width substantially equal to the limit of longitudinal movement of the shaft so that the gears 29 and 42 will at all times be in mesh with their respective gears 30 and 44 irrespective of the position of shaft 17.

The rear of the excavator is supported by a single creeping traction unit 47 mounted entirely beneath the frame and consisting of a casting or frame structure 48 in the ends of which transverse axles or shafts 49 are journaled carrying on their ends wheels 50 about which creeping traction members 51 are trained. The members 51 may be of any desired design and have their lowermost treads medially braced by idle wheels 52.

Centrally formed on the top of frame 48 is a pocket or recess 53 of rectangular shape to receive a rectangular projection 54 on the inner end of a quadrant or steering arm 55. The top face of the steering arm inner end is provided with a recess or socket 56 in axial alinement with the center of recess 53 and receiving the flanged end 57 of a pivot pin 58 secured to the under portion of the excavator frame.

The outer end of the steering arm is guided in a bracket 59, to prevent its movement in any direction other than on the vertical axis intersecting the recess 56, and has a segmental gear 60 with which meshes a worm gear 61 carried by a steering shaft 62. The rear creeping traction unit is steered by connecting the shaft 62 with a power unit, not shown and may be steered either jointly with or independent of the forward traction units, as will be obvious.

The end of projection 54 is slightly rounded to permit the free universal movement of the rear traction unit whereby the same readily adjusts itself for any unevenness in the surface over which the same passes, at the same time, the unit is held from steering movement independent of the steering arm by reason of the rectangular shape of the pocket 53 and the steering arm projection engaged therein.

While I have described and illustrated the application of this invention in connection with an excavator, it will be understood that it may be applied to cranes, derricks or any other type of machine to which the same is adaptable.

What I claim as my invention is:

1. In an excavator, a pair of jack-arms projected from opposite sides thereof, a creeping traction member supported from the outer end of each jack-arm, a pivotal connection between each traction member and its jack-arm, said pivotal connections permitting the steering movement of each traction member on a vertical axis, means for driving the traction members, and means for moving the traction members on their pivots to steer the same.

2. In an excavator, a pair of jack-arms projected from opposite sides thereof, a creeping traction member pivoted on a vertical axis on the outer end of each jack-arm, and a combined driving shaft and steering rod connected with the traction members to drive the same and move them on their pivots to steer the excavator.

3. In an excavator, a pair of jack-arms projected from opposite sides thereof, a creeping traction member supported from the outer end of each jack-arm, a pivotal connection between each traction member and its jack-arm, a driving shaft longitudinally shiftably journaled between the traction members, connections between the driving shaft and the traction members for driving the latter, and means for shifting the driving shaft to move the traction members on their pivots and steer the excavator.

4. In an excavator, a pair of jack-arms projected from opposite sides thereof, a creeping traction member supported from the outer end of each jack-arm, a pivotal connection between each traction member and its jack-arm, a driving shaft longitudinally shiftably journaled between the traction members, a universal drive coupling connecting each end of the drive shaft with the adjacent traction member, means for driving said shaft to drive the traction members, and means for shifting the driving shaft to effect pivotal movement of the traction members to steer the excavator.

5. In an excavator, a main frame, a pair of jack-arms projected transversely from opposite sides thereof, a creeping traction mounting frame mounted on the outer end portion of each jack-arm for pivotal movement on a vertical axis, a traction member carried by each mounting frame, a driving shaft transversely journaled in the main frame, means drivingly connecting the ends of said shaft with adjacent traction members, means for rotating the drive shaft in either direction to drive the traction members in either direction, and means for longitudinally sliding the drive shaft in either direction to impart pivotal movement to the traction mounting frames and steer the excavator.

6. In an excavator including a traction member, a combined drive and steering shaft for the traction member, means for rotating said shaft to drive the traction member, and means operable to shift said shaft longitudinally to effect a steering of the traction member.

7. In an excavator including a traction member, a combined drive and steering shaft for the traction member, means for rotating said shaft to drive the traction member, a worm gear freely rotatably but nonslidably mounted on said shaft, an internally threaded member in which said worm gear is threaded, and means for rotating the worm gear to thread the same through said member to longitudinally shift said shaft and steer the traction member.

8. In an excavator including a supporting member, a creeping traction mounting including a frame member, a bearing member journaled on the supporting member for movement on a substantially horizontal axis, and vertically aligned upper and lower projections on the bearing member engaging recesses in the frame member to provide a pivotal connection between the frame member and bearing member, whereby the traction mounting is permitted movement on a substantially vertical axis.

9. In an excavator, a main frame, a creeping traction unit frame, a creeping traction member carried by the unit frame, means connecting the unit frame with the main frame for movement on a substantially vertical axis for steering, a driving shaft for the traction member mounted in the unit frame to one side of its steering axis, a drive shaft mounted in the main frame in approximate alignment with the unit frame driving shaft, means connecting the shafts, and means operable to longitudinally shift the main frame driving shaft to effect the steering movement of the unit frame on its axis.

10. In an excavator, a main frame, a pair of spaced creeping traction unit frames, a creeping traction member carried by each unit frame, means connecting each unit frame with the main frame for movement on a substantially vertical axis for steering, driving shafts for the traction members mounted in each unit frame to one side of its steering axis, a drive shaft mounted in the main frame in approximate alignment with the unit frame driving shaft, means connecting the main frame driving shaft with the unit frame driving shafts, and means operable to longitudinally shift the main frame driving shaft to effect the simultaneous steering movement of the unit frames on their axes.

11. In an excavator, a main frame, a pair of spaced creeping traction members, means mounting said members adjacent one end of the main frame for steering movements on substantially vertical axes, another creeping traction member, means mounting the last-mentioned traction member adjacent the other end of the main frame for steering movement on a substantially vertical axis, means for driving the last-mentioned traction member, means for steering the last-mentioned traction member, a driving shaft for each of the pair of traction members, a shaft mounted in the main frame, means connecting the main frame shaft with the driving shafts of the pair of traction members, means for rotating the main frame shaft to drive the pair of traction members, and means for shifting the main frame shaft to effect the simultaneous steering of the pair of traction members.

12. In an excavator, a creeping traction mounting including an endless track laying means, single means connecting the mounting with the excavator to permit its free universal movement on any horizontal axis to accommodate any unevenness in the surface over which the same passes and its movement on a vertical axis to permit steering, means connecting the mounting with the excavator for moving the mounting on its vertical axis to steer the excavator, and means for driving the track laying means of the mounting whereby the excavator is propelled and the steering thereof expedited.

13. In an excavator, a supporting frame structure, a rear, center creeping traction unit, a connection between the medial portion of the rear unit and the frame structure whereby the unit is permitted a controlled movement on a vertical axis for steering and a free universal rocking movement about any horizontal axis to adjust itself to any unevenness in the surface over which the same may pass, sidewise spaced creeping traction units mounted at the forward portion of the frame structure, and a connection between the medial portion of each forward traction unit and the frame structure to permit the free pivotal movement of each of said units on a substantially single horizontal axis.

14. In an excavator, a supporting frame structure, a rear, center creeping traction unit, a connection between the medial portion of the rear unit and the frame structure whereby the unit is permitted a controlled movement on a vertical axis for steering and a free universal rocking movement about any horizontal axis to adjust itself to any unevenness in the surface over which the same may pass, sidewise spaced creeping traction units mounted at the forward portion of the frame structure, and a connection between the medial portion of each forward unit and the frame structure whereby the units are permitted a controlled movement on a vertical axis for steering and free rocking movement on a horizontal axis to adjust themselves to unevenness in the surface over which the same may pass.

In testimony whereof I affix my signature.

SVANTE R. W. M. BAGER.